United States Patent
Harmon et al.

(10) Patent No.: US 11,453,342 B2
(45) Date of Patent: Sep. 27, 2022

(54) STORAGE ASSEMBLY FOR VEHICLE

(71) Applicant: Ford Global Technologies, LLC, Dearborn, MI (US)

(72) Inventors: Michael John Harmon, Westland, MI (US); Carlos Gonzales, Berkley, MI (US); Gabriella Marie Gyllenhoff Jacobsen, Ferndale, MI (US); Michael Huskey, Farmington, MI (US); Daveanand M. Singh, Detroit, MI (US); Arnav Wagh, Detroit, MI (US); David Vondle, Chicago, IL (US)

(73) Assignee: Ford Global Technologies, LLC, Dearborn, MI (US)

( * ) Notice: Subject to any disclaimer, the term of this patent is extended or adjusted under 35 U.S.C. 154(b) by 144 days.

(21) Appl. No.: 17/153,064

(22) Filed: Jan. 20, 2021

(65) Prior Publication Data

US 2022/0227300 A1   Jul. 21, 2022

(51) Int. Cl.
*B60R 5/04* (2006.01)

(52) U.S. Cl.
CPC .................. *B60R 5/045* (2013.01)

(58) Field of Classification Search
CPC .......... B60R 5/045; B60R 5/04; B60R 5/044; B60N 2/3075; B60N 2/3077; B60N 2/3079; B65D 1/24
USPC ...... 296/37.1, 37.3, 37.8, 37.16, 37.14, 24.4
See application file for complete search history.

(56) References Cited

U.S. PATENT DOCUMENTS

| | | |
|---|---|---|
| 3,008,755 A | 11/1961 | Hale |
| 3,151,906 A | 10/1964 | Roberts |
| 4,519,646 A | 5/1985 | Leitermann et al. |
| 6,000,751 A | 12/1999 | Kato et al. |
| 7,059,646 B1 | 6/2006 | DeLong et al. |
| 7,077,463 B2 | 7/2006 | Sun et al. |
| 7,281,761 B2 | 10/2007 | Brown et al. |
| 8,376,443 B2 | 2/2013 | Kemp et al. |
| 8,814,245 B1 * | 8/2014 | Welch ............... B60R 5/04 296/37.16 |
| 8,852,711 B2 | 10/2014 | Preisler et al. |
| 8,973,965 B2 | 3/2015 | Zalan et al. |
| 10,005,573 B2 * | 6/2018 | Miros ............... B65B 7/26 |
| 10,195,968 B2 | 2/2019 | Barnes |
| 10,286,816 B2 | 5/2019 | Murray et al. |
| 2004/0026951 A1 | 2/2004 | Rudberg et al. |
| 2004/0105744 A1 * | 6/2004 | Warner ............... B60R 7/02 414/522 |
| 2006/0255611 A1 | 11/2006 | Smith et al. |

(Continued)

FOREIGN PATENT DOCUMENTS

| | | | |
|---|---|---|---|
| DE | 102012023470 A1 * | 6/2014 | ............ B60R 5/04 |
| EP | 2957457 B1 | 4/2020 | |
| JP | 2006219017 A | 8/2006 | |

*Primary Examiner* — Joseph D. Pape
(74) *Attorney, Agent, or Firm* — Vichit Chea; Price Heneveld LLP

(57) ABSTRACT

A cargo storage assembly for a vehicle includes an outer shell defining a primary cavity and an inner shell positioned within the primary cavity. A plurality of reinforcement members are positioned between the outer shell and the inner shell within the primary cavity. A cover assembly is coupled with the outer shell and includes a first portion hingedly coupled with a second portion. Each of the first and second portions is configured to be rotatable about an axis from a closed position to an open position.

20 Claims, 12 Drawing Sheets

(56) References Cited

U.S. PATENT DOCUMENTS

2007/0052254 A1  3/2007  Sturt et al.
2011/0260489 A1  10/2011 Gerhardt
2016/0229317 A1  8/2016  Janally et al.

* cited by examiner

STORAGE ASSEMBLY FOR VEHICLE

FIELD OF THE DISCLOSURE

The present disclosure generally relates to a storage assembly for a vehicle, and more specifically to a storage assembly within a vehicle cargo space.

BACKGROUND OF THE DISCLOSURE

Vehicles may include a cargo space positioned proximate a rear door of the vehicle. The cargo space may be configured as a storage space.

SUMMARY OF THE DISCLOSURE

According to one aspect of the present disclosure, a cargo storage assembly for a vehicle includes an outer shell defining a primary cavity and an inner shell positioned within the primary cavity. A plurality of reinforcement members are positioned between the outer shell and the inner shell within the primary cavity. A cover assembly is coupled with the outer shell and includes a first portion hingedly coupled with a second portion. Each of the first and second portions is configured to be rotatable about an axis from a closed position to an open position.

Embodiments of this aspect of the disclosure can include any one or a combination of the following features:
  a reinforcement members interspaced along a plurality of walls of an outer shell;
  an inner shell defining one or more secondary cavities;
  a first portion of a cover assembly including first and second side sections, and a second portion of the cover assembly including third and fourth side sections, wherein the first side section is hingedly coupled with the third side section and the second side section is hingedly coupled with the fourth side section;
  first and second portions joined by a living hinge;
  a first portion including a support section hingedly coupled with a seatback section;
  a seatback section hingedly coupled with a second portion of a cover assembly;
  a support section including a first edge and a seatback portion including a second edge, wherein the first and second edges are configured to be aligned when a cover assembly is in a closed position; and/or
  a cover assembly including at least one outwardly extending corner member.

According to another aspect of the present disclosure, a cargo storage assembly for a vehicle includes an outer shell including at least one wall and defining a primary cavity and an inner shell positioned within the primary cavity. A support member is coupled with the at least one wall and defines a receiving slot. A cover assembly is movable between a closed position and a seating position. The cover assembly includes a first portion hingedly coupled with a second portion. The first portion includes a support section hingedly coupled with a seatback section. The support section includes an outwardly extending tab, and the outwardly extending tab is configured to be received by the receiving slot when the cover assembly is in the seating position.

Embodiments of this aspect of the disclosure can include any one or a combination of the following features:
  a plurality of reinforcement members positioned within a primary cavity between an outer shell and an inner shell;
  a substrate at least partially supported by a plurality of reinforcement members and coupled with an outer shell;
  a seatback section of a first portion is hingedly coupled with a second portion;
  a support section including a first edge and a seatback section including a second edge, wherein the first and second edges are configured to be aligned when a cover assembly is in a closed position; and/or
  a cover assembly including a plurality of hinges interspaced along first and second edges.

According to another aspect of the present disclosure, a cargo storage assembly for a vehicle includes an outer shell defining a primary cavity and an inner shell positioned within the primary cavity and spaced apart from the outer shell. A plurality of reinforcement members are positioned within the primary cavity between the outer shell and the inner shell. A cover assembly includes a first portion hingedly coupled with a second portion by a first plurality of hinges. The first portion includes a first side section hingedly coupled with a second side section by a second plurality of hinges, and the second portion includes a third side section hingedly coupled with a fourth side section by a third plurality of hinges Embodiments of this aspect of the disclosure can include any one or a combination of the following features:
  an inner shell defining at least one secondary cavity;
  a first portion movable relative to a second portion about a first axis;
  first and third side sections movable relative to second and fourth side sections about a second axis; and/or
  at least one of a first plurality of hinges, a second plurality of hinges, and a third plurality of hinges is a living hinge.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
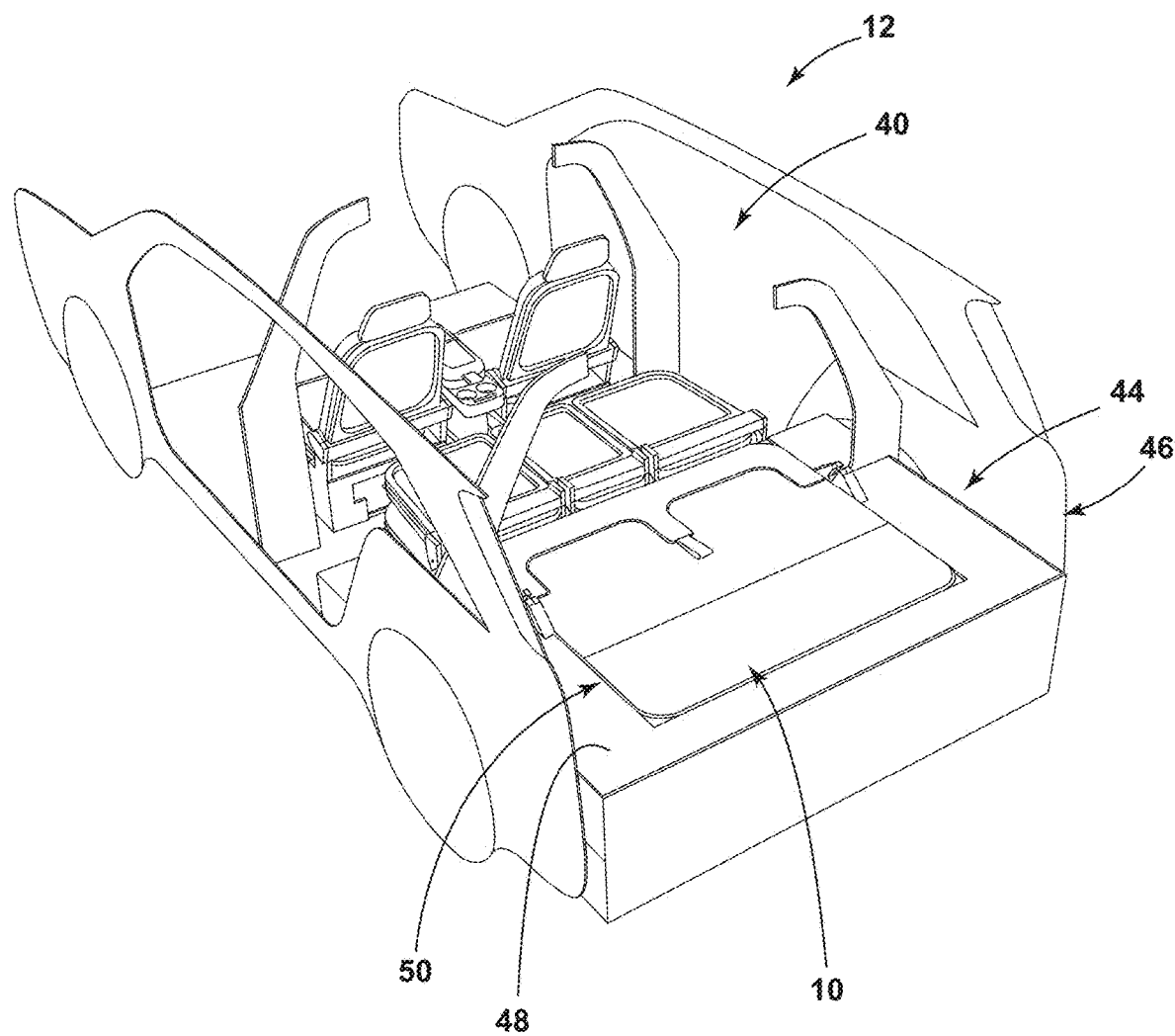
FIG. 1 is a rear perspective view of a schematic vehicle including a cargo storage assembly, according to various examples.

The present illustrated embodiments reside primarily in combinations of method steps and apparatus components related to a cargo storage assembly for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-12, reference numeral 10 generally designates a cargo storage assembly for a vehicle 12. The cargo storage assembly 10 includes an outer shell 14 defining a primary cavity 16. An inner shell 18 is positioned within the primary cavity 16 and may define one or more secondary cavities 20. A plurality of reinforcement members 22 is positioned within the primary cavity 16 and between the outer shell 14 and the inner shell 18. A cover assembly 24 is coupled with the outer shell 14 and includes a first portion 26 hingedly coupled with a second portion 28. Each of the first and second portions 26, 28 is configured to be rotatable about an axis X from a closed position to an open position. An actuation member 30 may be positioned on one or both of the first and second portions 26, 28 for moving the respective portion 26, 28 between the respective closed and open positions.

Figure 2:
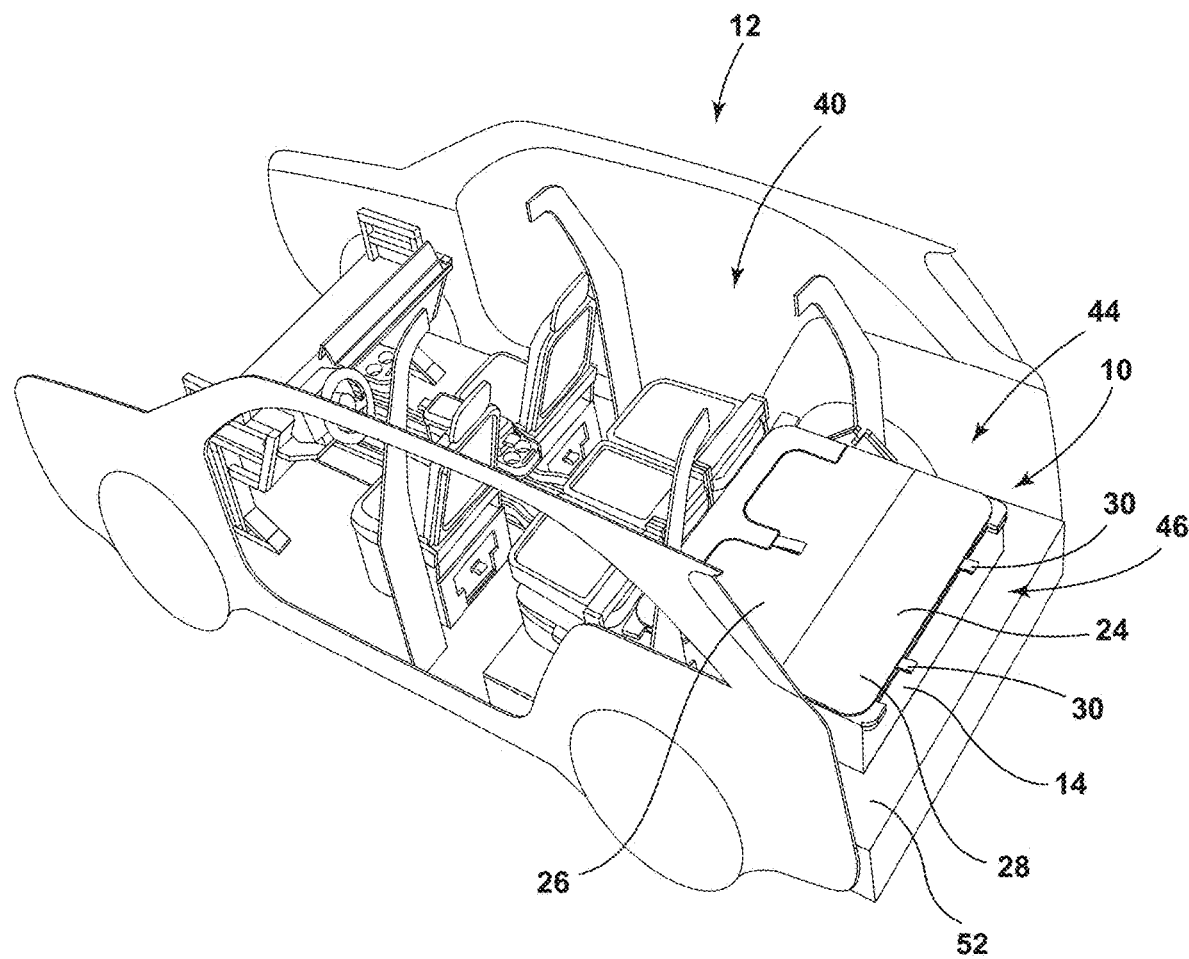
FIG. 2 is a side perspective view of a schematic vehicle including a cargo storage assembly with a cargo floor removed, according to various examples.

Referring now to FIGS. 1 and 2, a vehicle 12 is schematically illustrated having an interior 40 including a cargo space 44 configured to house a cargo storage assembly 10. The cargo space 44 is generally defined as being positioned in a rear portion of the vehicle interior 40 (e.g., rearward of a rear seating assembly). The cargo space 44 may be positioned proximate a rear opening 46 of the vehicle 12 and may be configured as a storage space accessible via the rear opening 46. In various examples, the rear opening 46 may be configured to be selectively closed by a rear vehicle door, such as a lift gate or tailgate (not shown). It will be understood that the rear opening 46 may be closed by any configuration of a rear vehicle door without departing from the scope of the present disclosure. It will also be understood that the cargo storage assembly 10 illustrated herein may be used in any vehicle having a rear opening 46 configured to be closed by a rear vehicle door without departing from the scope of the present disclosure.

As shown in FIG. 1, the cargo space 44 may include a cargo floor 48 spaced apart from a base 52 of the vehicle 12. The cargo floor 48 may be positioned to at least partially conceal the cargo storage assembly 10 when the cargo storage assembly 10 is positioned within the cargo space 44. For example, the cargo floor 48 may define an opening 50 configured to at least partially receive the cargo storage assembly 10. The opening 50 may be of a shape and size to accommodate the cargo storage assembly 10 and allow movement of the cover assembly 24 between closed and open positions. In assembly, the cargo storage assembly 10 may rest at least partially on the base 52 of the vehicle 12 and may be positioned between the base 52 and the cargo floor 38. When the cover assembly 24 is in a closed position, the cargo floor 48 may be positioned substantially co-planar with the cover assembly 24. When the cover assembly 24 is in any one of the open positions or in the seating position, the cover assembly 24 may extend at least partially through the opening 50 of the cargo floor 48.

Figure 3:
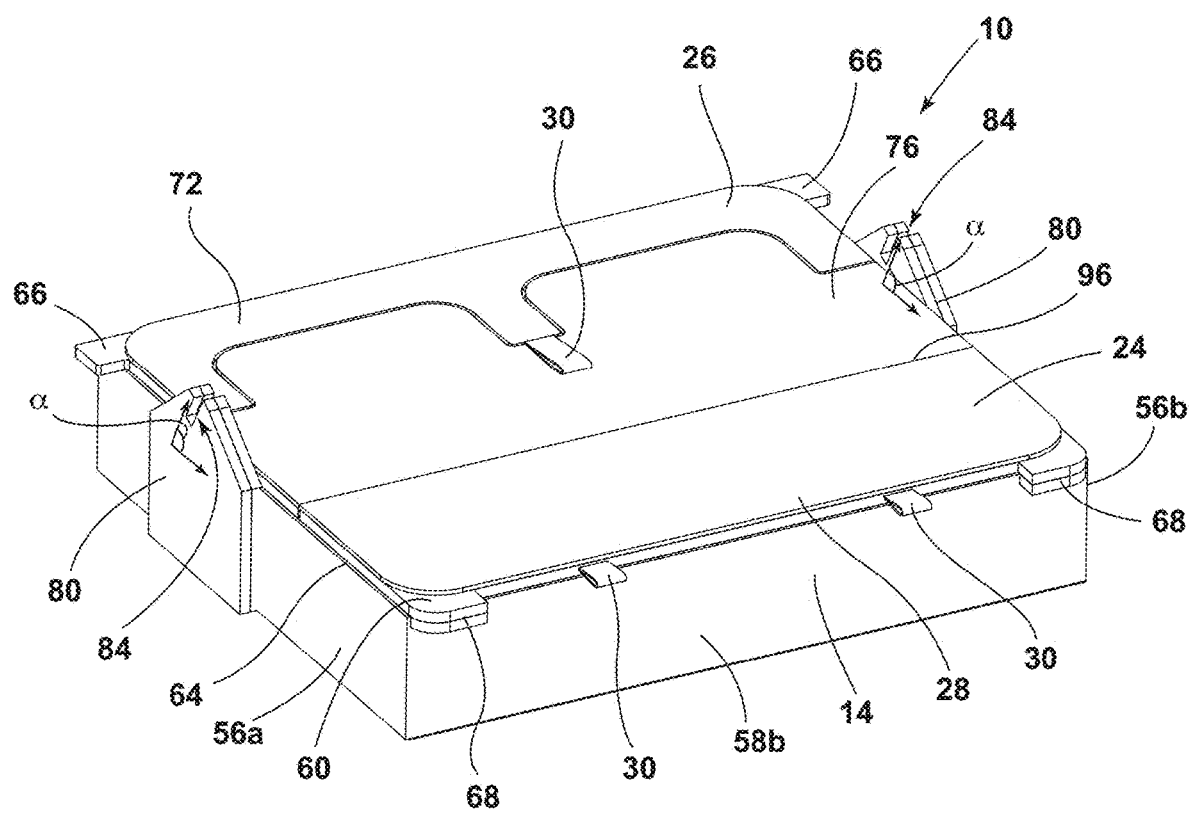
FIG. 3 is a side perspective view of a cargo storage assembly with a cover assembly in a closed position, according to various examples.
Figure 4:
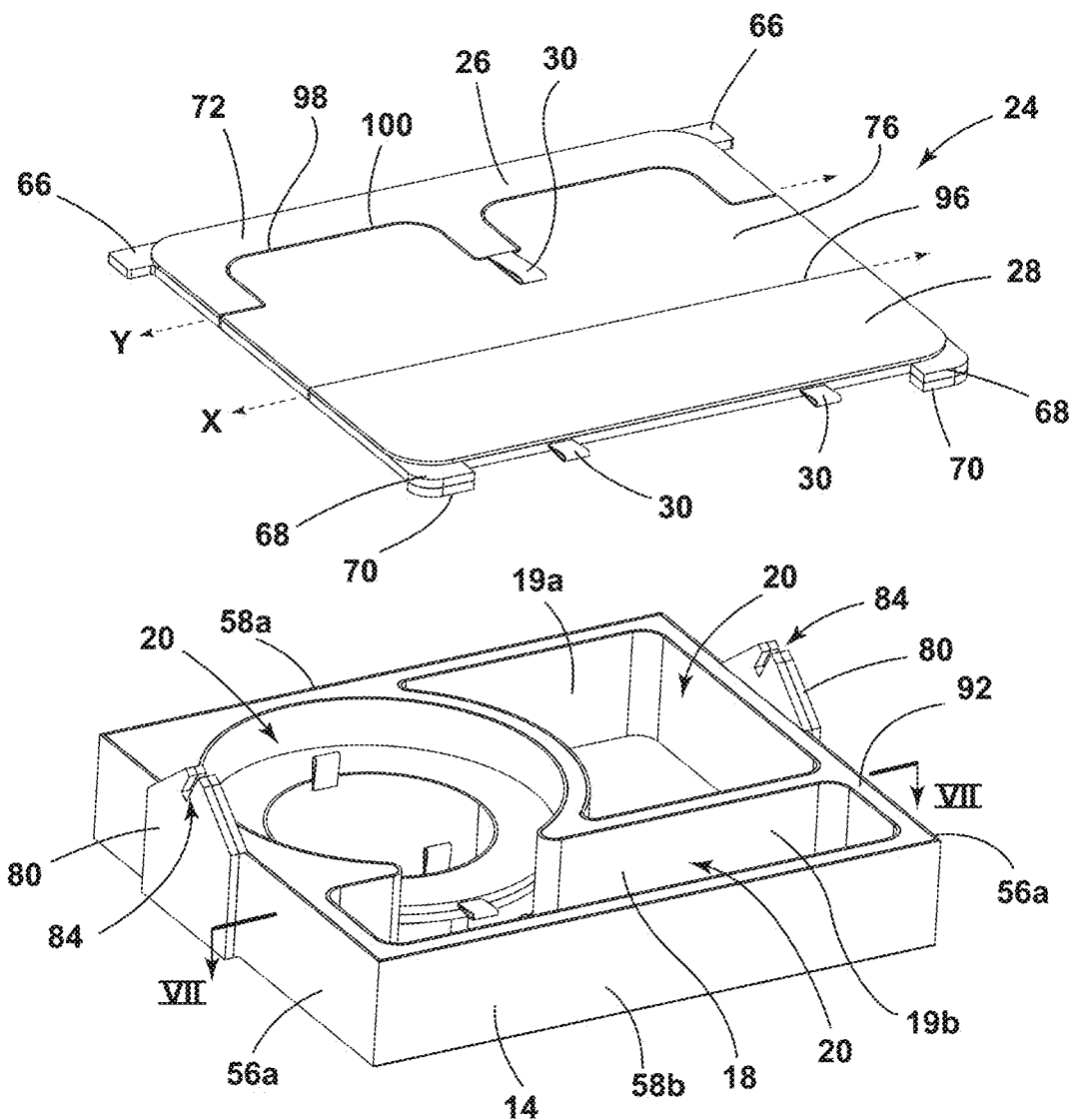
FIG. 4 is an exploded side perspective view of the cargo storage assembly of FIG. 3.

Referring now to FIGS. 2-4, the cargo storage assembly 10 includes an outer shell 14, as previously introduced. The outer shell 14 includes a pair of lateral walls 56a, 56b spaced apart by a plurality of cross walls 58a, 58b. As illustrated, the outer shell 14 may have a generally square or rectangular cross-section when viewed from above (see FIG. 7). Each of the walls 56, 58 of the outer shell 14 extends upward from the base 52 of the vehicle 12 to the cargo floor 48 when the cargo storage assembly 10 is positioned within the cargo space 44. It is contemplated that the walls 56a, 56b, 58a, 58b may be integrally formed or may be coupled to define a periphery of the outer shell 14. Together, the walls 56a, 56b, 58a, 58b are positioned to define the primary cavity 16 of the outer shell 14.

As best shown in FIG. 4, the cargo storage assembly 10 further includes the inner shell 18. As illustrated, the inner shell 18 may include one or more portions 19a, 19b configured to be positioned within the primary cavity 16 of the outer shell 14. The inner shell 18 defines one or more secondary cavities 20 configured as storage compartments for various items (e.g., tools, tires, etc.). In some examples, as illustrated in FIG. 4, one or more of the secondary cavities 20 may be defined to be shaped for a specific item, such as a tire. It is contemplated that the inner shell 18 may also be configured as a single piece defining the one or more secondary cavities 20 without departing from the scope of the present disclosure.

Referring now to FIGS. 3 and 4, the walls 56, 58 of the outer shell 14 of the cargo storage assembly 10 further define an upper edge 64 of the cargo storage assembly 10. The upper edge 64 is configured to at least partially support the cover assembly 24. In various examples, the cover assembly 24 may be coupled with the upper edge 64 of the outer shell 14. In other examples, the cover assembly 24 may be configured to rest on the upper edge 64 of the outer shell 14. In still other examples, the cover assembly 24 may be configured to otherwise engage with the outer shell 14 to cover the outer shell 14. The cover assembly 24 may also be configured to provide selective access to the secondary cavities 20 defined by the inner shell 18 of the cargo storage assembly 10, as described in more detail elsewhere herein.

Figure 5:
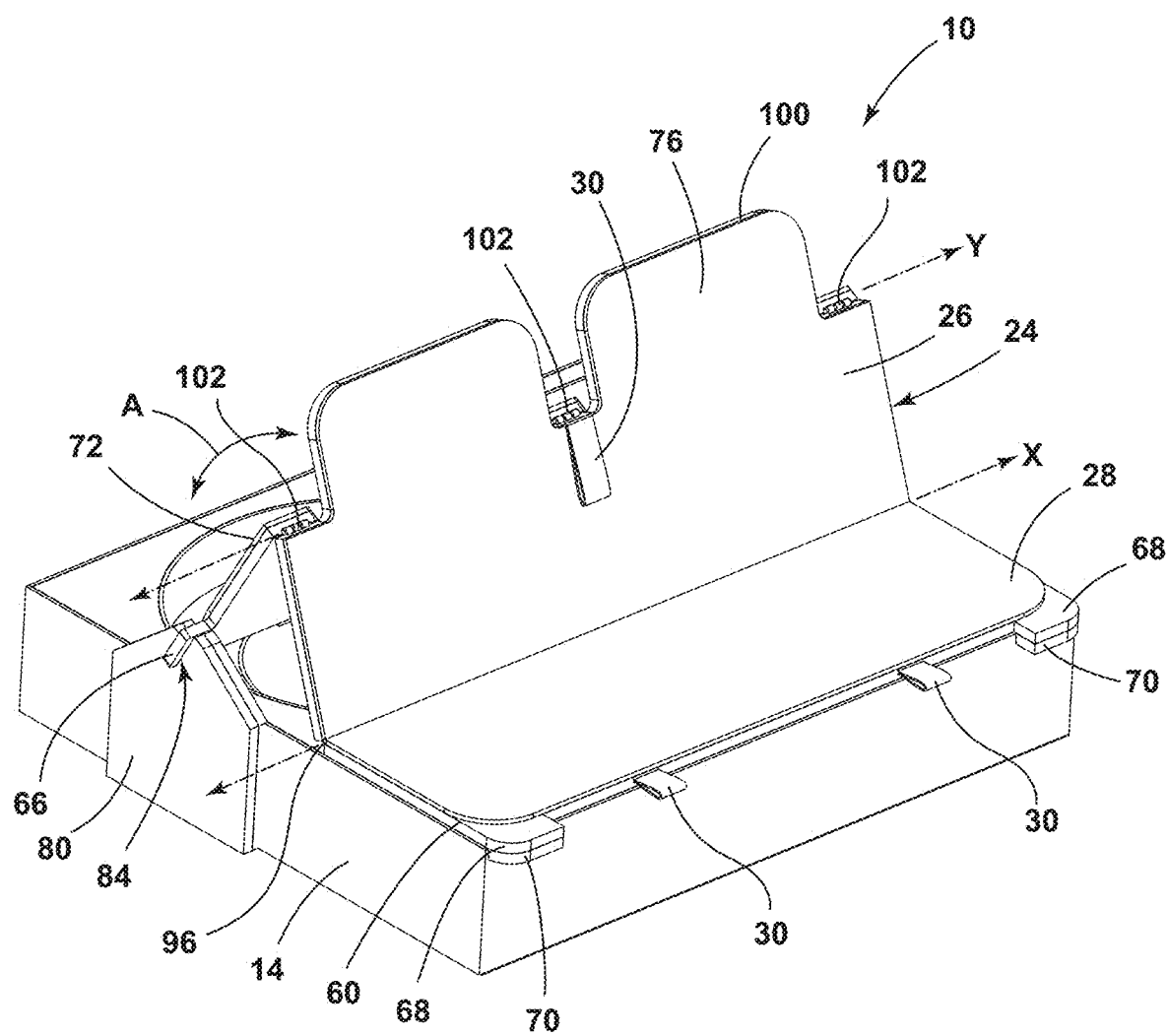
FIG. 5 is a side perspective view of the cargo storage assembly of FIG. 3 with the cover assembly in a seating position.
Figure 6:
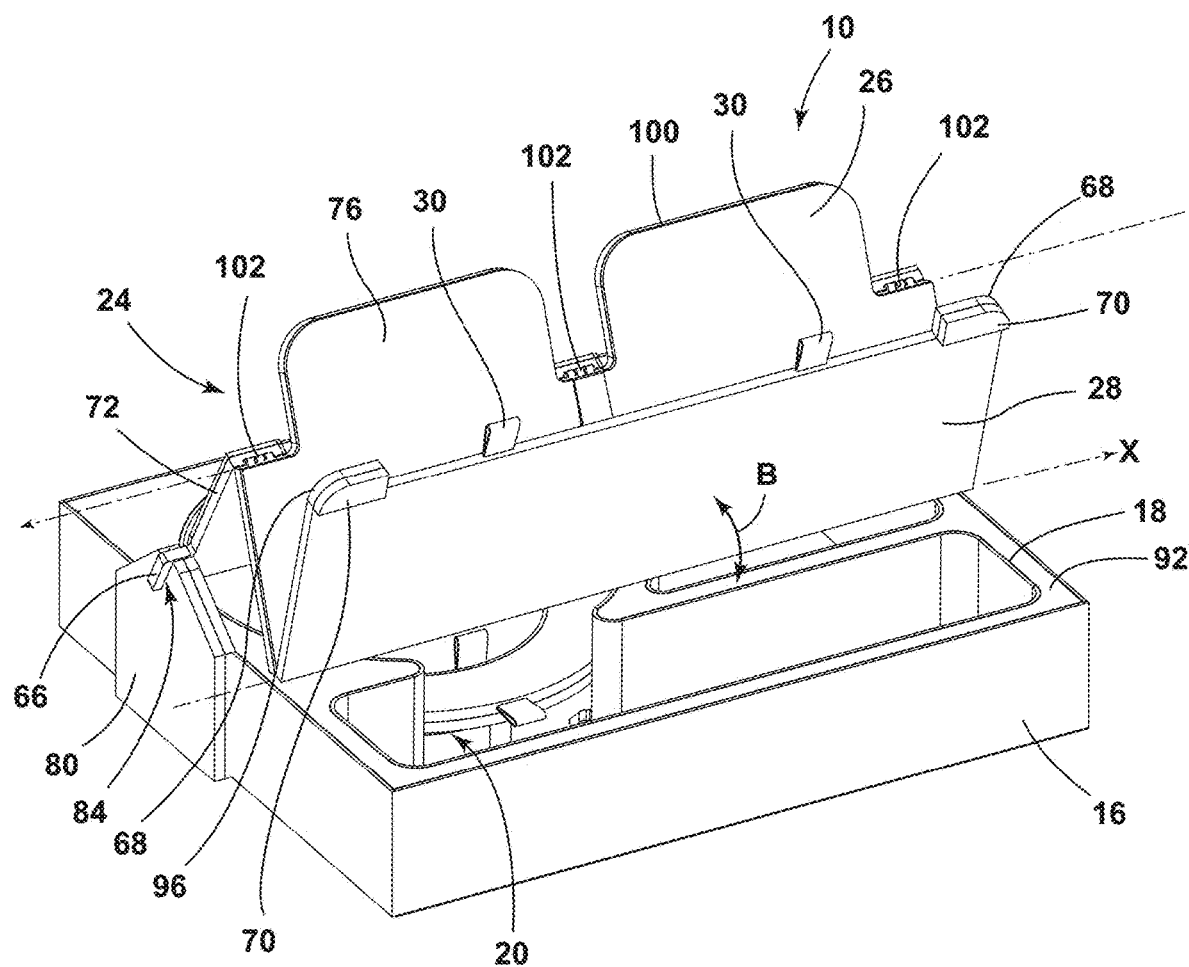
FIG. 6 is a side perspective view of the cargo storage assembly of FIG. 3 with the cover assembly in a seating position and a portion of the cover assembly in a raised position.

The cover assembly 24 includes a cover support 60 formed as a substrate at least partially supported by the upper edge 64 of the outer shell 14. In various examples, the cover support 60 is configured to define first and second portions 26, 28 each configured to provide access to one or more of the secondary cavities 20. As best shown in FIG. 2, the second portion 28 of the cover assembly 24 is positioned proximate the rear opening 46 when the cargo storage assembly 10 is positioned within the cargo space 44, and the first portion 26 of the cover assembly 24 is positioned spaced apart from the rear opening 46 by the first portion 26. Each of the first and second portions 26, 28 is configured to be rotatable about a first axis X, as illustrated in FIGS. 4-6 and discussed in more detail elsewhere herein. It is contemplated that the cover assembly 24 may include a substrate (e.g., carpet) positioned across a part of or an entirety of the cover support 60 to provide an aesthetic to complement the cargo space 44 (FIG. 1).

As shown in FIGS. 3-6, the cover support 60 may further include tabs 66 extending laterally outward from the cover support 60. The tabs 66 may be laterally opposing tabs 6 extending proximate the first portion 26 of the cover assembly 24 and the lateral walls 56a, 56b. In other words, each tab 66 is positioned proximate one of the lateral walls 56a, 56b of the outer shell 14. The tabs 66 may each be substantially rectangular, as illustrated. However, it is contemplated that the tabs 66 may have a rounded shape, a triangular shape, or any other shape without departing from the scope of the present disclosure. Each tab 66 may be configured to provide additional support for the cover assembly 24 when the cover assembly 24 is in the closed position (see FIG. 3) or may be used for lifting the first portion 26 of the cover assembly 24 into an open position.

With continued reference to FIGS. 3 and 4, the cover support 60 further includes outwardly extending corner members 68. Each corner member 68 is located at a joinder of one of the lateral walls 56a, 56b and the cross wall 58b proximate the second portion 28. As shown in FIGS. 3 and 4, each corner member 68 may be beveled. However, it is contemplated that each corner member 68 may be angular without departing from the scope of the present disclosure. When the cargo storage assembly 10 is positioned within the cargo space 44, the corner members 68 extend toward the rear opening 46 of the vehicle 12 (see FIGS. 1 and 2). Each corner member 68 may be positioned to at least partially form a corner of the cover support 60 extending over one of the cross-walls 58a, 58b and may extend parallel to the lateral walls 56a, 56b of the outer shell 14 when the cover support 60 is in the closed position. In various examples, the corner members 68 are positioned to at least partially support the cover assembly 24 on the lateral walls 56a, 56b.

In other examples, the corner members 68 may be configured to guide engagement of the cover assembly 24 with the outer shell 14. Each corner member 68 further includes a lower protrusion 70 extending downward from the corner member 68 of the cover support 60 and along the respective wall of the pair of cross walls 58a, 58b. Each lower protrusion 70 may extend at least partially past the upper edge 64 of the walls 56a, 56b, 58a, 58b to guide positioning and retention of the cover assembly 24 in the closed position.

Referring now to FIGS. 3-6, as previously introduced, the cover assembly 24 of the cargo storage assembly 10 may include the first and second portions 26, 28. The first portion 26 and the second portion 28 are rotatable about the first axis X between open and closed positions. In various examples, the first and second portions 26, 28 may be joined by one or more hinges 96 defining the first axis X. The plurality of hinges 96 may be any kind of hinge including, but not limited to, for example, a surface mount hinge or a living hinge. As shown in FIGS. 5 and 6, each of the first and second portions 26, 28 may be rotatable about the first axis X as illustrated by arrows A and B, respectively.

When the cover assembly 24 is in the closed position, both the first and second portions 26, 28 are in contact with the upper edge 64 of the outer shell 14 such that the outer shell 14 is fully concealed (see FIG. 3). When the cover assembly 24 is in the open position, one or both of the first and second portions 26, 28 are raised such that the outer shell 14 is exposed and the secondary cavities 20 of the inner shell 18 are accessible by a user (see FIG. 6) In various examples, the cover assembly 24 may further be moved into a seating position (see FIG. 5), as discussed in more detail below.

As illustrated in FIGS. 3 and 4, the first portion 26 of the cover assembly may include a support section 72 and a seatback section 76. The support section 72 may include a first edge 98 defining a seatback shape, and the seat section 76 may include a second edge 100 configured to be aligned with the first edge 98 and extending along a top of the seat section 76. When the first portion 26 is in the closed position, the first and second edges 98, 100 may be aligned to conceal the division of the support section 72 and the seatback section 76.

As shown in FIG. 5, the seatback section 76 and the support section 72 may be coupled together by a plurality of hinges 102. The plurality of hinges 102 may be interspaced along the first and second edges 98, 100 such that the seatback section 76 is rotatable relative to the support section 72 about a second axis Y. The second axis Y is substantially parallel to the first axis X. It is contemplated that the plurality of hinges 102 may be any kind of hinge including, but not limited to, for example, a surface mount hinge or a living hinge. The hinges 102 are positioned on a bottom surface of the cover support 60 to at least partially conceal the hinges 102. It will also be understood that any number hinges 102 may be used without departing from the scope of the present disclosure.

As shown in FIGS. 5 and 6, the tabs 66 of the cover assembly 24 extend from the support section 72 of the first portion 26 and are configured to at least partially support the first portion 26 when the cover assembly 24 is in the seating position, as discussed in more detail below.

The cargo storage assembly 10 may further include support members 80 configured to receive the tabs 66 to support the support section 72 when the cover assembly 24 is in the seating position. Each of the support members 80 may be coupled with a respective lateral wall 56a, 56b. Alternatively, each of the support members 80 may be integrally formed with a respective lateral wall 56a, 56b. As best shown in FIG. 4, the support members 80 are laterally aligned to form a pair of laterally opposing support members 80.

As best shown in FIG. 3, each of the support members 80 defines a slot 84 defined to open upward. Each slot 84 is defined at an angle α measured from the upper edge 64 of respective wall 56a, 56b of the outer shell 14. As shown in FIGS. 5 and 6, each of the tabs 66 is configured to correspond with one of the slots 84. Each slot 84 is configured to receive the respective tab 66 to at least partially support the support section 72 when the cover assembly 24 is in the seating position. The angle α of each slot 84 is configured to place the support section 72 at an incline upward toward the first and second edges 98, 100 such that the support section 72 holds the seatback section 76 at an angle relative to the second portion 28.

Referring again to FIGS. 3-6, a plurality of actuation members 30 may extend from one or more points of the cover assembly 24. Each actuation member 30 is positioned to allow a single force application to move the cover assembly 24 from the closed position to one of the open position and the seating position. Each of the plurality of actuation members 30 is configured to provide a point for a user to pull to move one or both of the first and second portions 26, 28 of the cover assembly 24 into one of the open position and the seating position. For example, an actuation member 30 may be a tab 30 extending from and centered along the first edge 98 of the seatback section 76. The tab 30 may be configured to pull the seatback portion upward and forward along arrow A until the tabs 66 are received within the respective receiving slots 84 when a user pulls the tab 30 toward the second portion 28. In other examples, the actuation member 30 may be a tab 30 extending from the second portion 28 of the cover assembly 24 to allow a user to rotate the second portion 28 from the closed position to an open position by pulling the actuation member 30 upward along arrow B.

As best shown in FIG. 5, the second portion 28 acts as a seat base for the seatback section 76 when the cover assembly 24 is in the seating position. When the cover assembly 24 is in the seating position, it is contemplated that the second portion 28 may be moved into an open position, as illustrated by arrow B of FIG. 6, to provide access to the secondary cavities 20 below.

Figure 7:
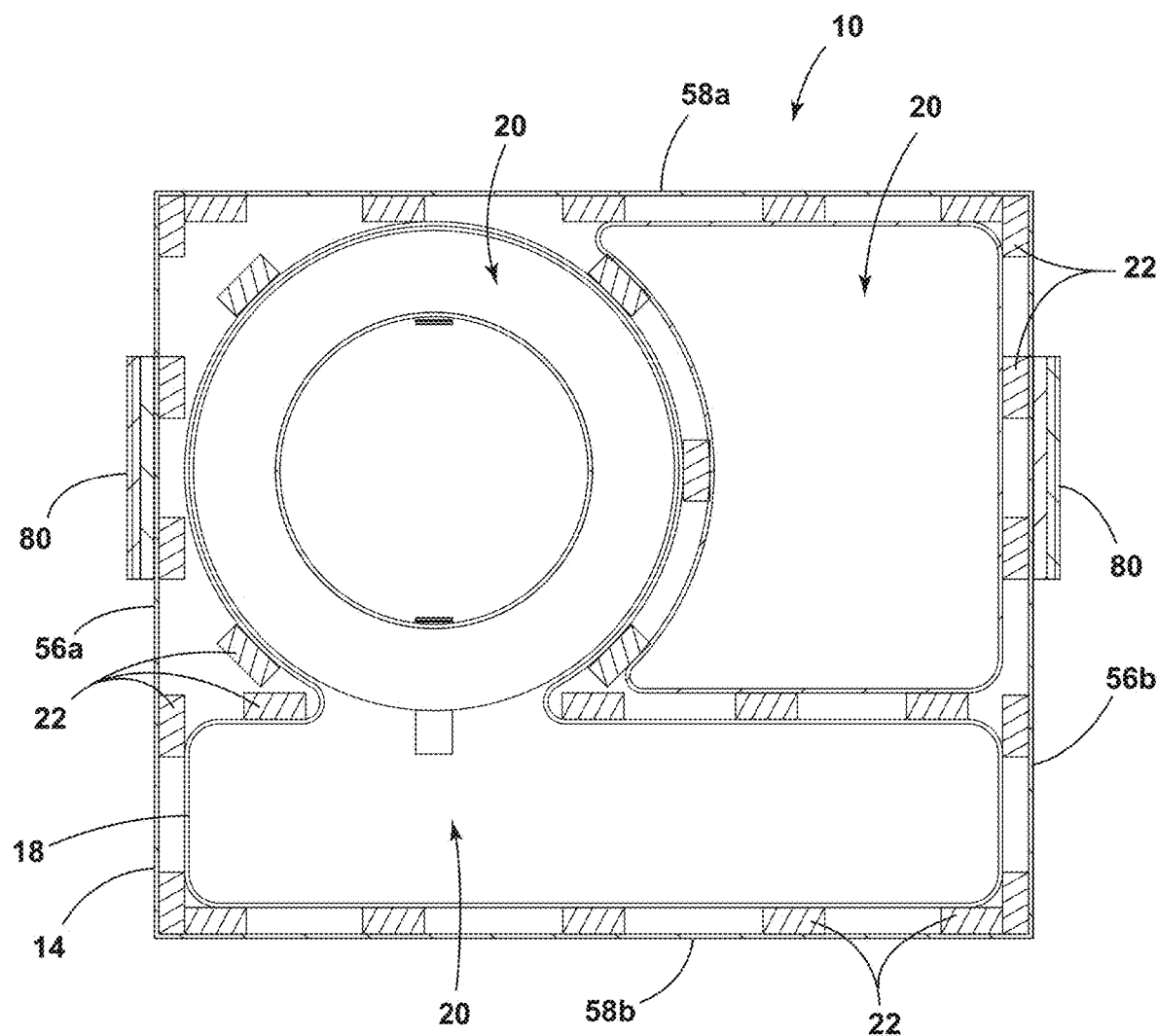
FIG. 7 is a cross-sectional view of cargo storage assembly of FIG. 3 taken along line VII-VII.

Referring now to FIG. 7, a cross-section of the cargo storage assembly 10 is illustrated. As previously introduced, the outer shell 14 defines the primary cavity 16, and the inner shell 18 is positioned within the primary cavity 16. A plurality of reinforcement members 22 are positioned within the primary cavity 16 between the outer shell 14 and the inner shell 18. As illustrated, the plurality of reinforcement members 22 may each have substantially rectangular cross-section. The plurality of reinforcement members 22 may be evenly spaced within the primary cavity 16 or may be unevenly spaced to accommodate various configurations. The plurality of reinforcement members 22 are configured to provide structural support for the cargo storage assembly 10 to form a seat and for the cargo storage assembly 10 to have cargo placed on top of the cover assembly 24 when the cover assembly 24 is in the closed position (see FIG. 1). For example, the plurality of reinforcement members 22 may be configured to support an upper substrate 92 of the outer shell 14 and/or the cover assembly 24. The plurality of reinforcement members 22 may further allow for various configurations of the inner shell 18 while still providing support for the cover assembly 24.

Figure 8:
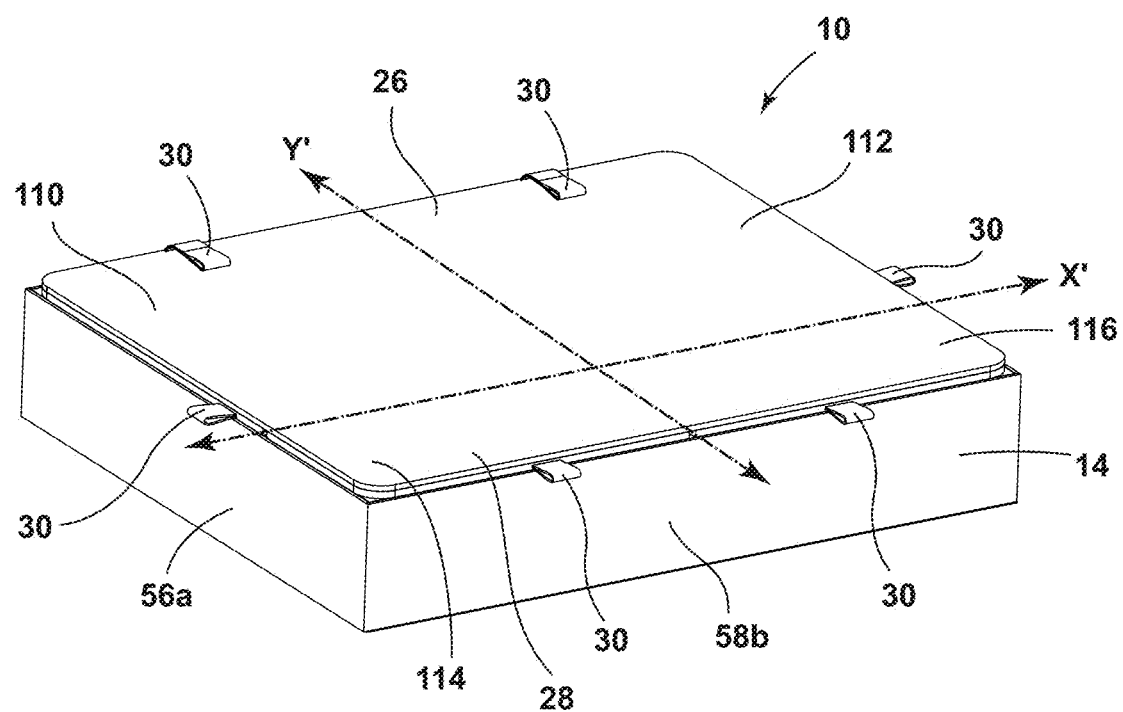
FIG. 8 is a side perspective view of a cargo storage assembly, according to various examples.

Referring now to FIGS. 8-12, in other examples, the cargo storage assembly 10 may include a cover assembly 24 having a plurality of sections 110, 112, 114, 116 for accessing the secondary cavities 20 defined by the inner shell 18. As shown in FIG. 8, the cover assembly 24 may include the first and second portions 26, 28 rotatable about a first axis X'. In various examples, one of the first and second portions 26, 28 may be larger than the other. In other examples, the first and second portions 26, 28 may be substantially the same size.

Figure 9:
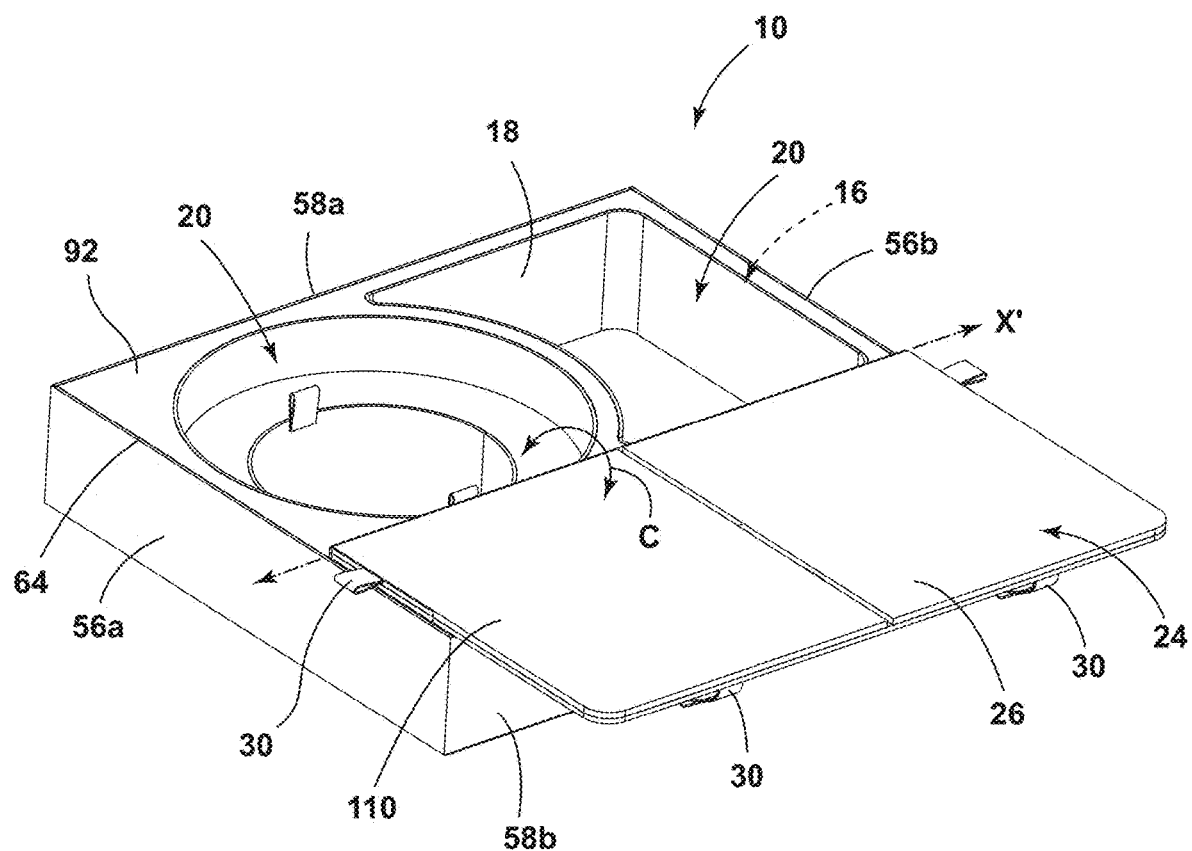
FIG. 9 is a side perspective view of the cargo storage assembly of FIG. 8 with a first portion of a cover assembly in an open position.
Figure 10:
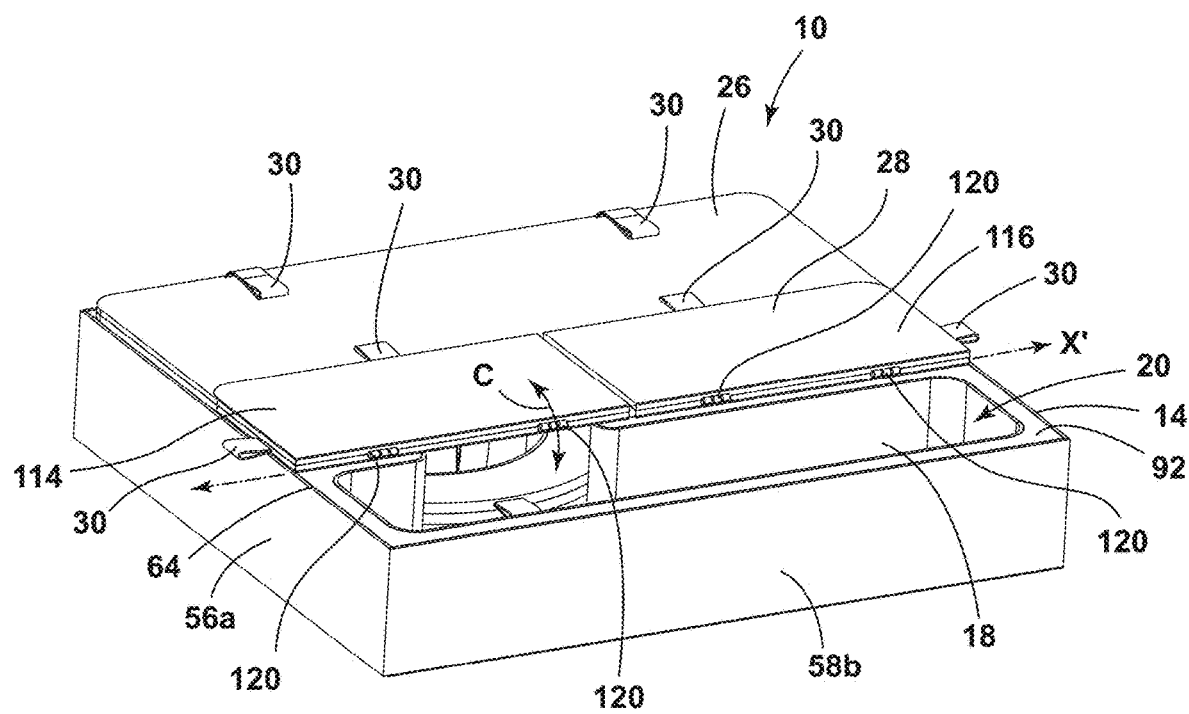
FIG. 10 is a side perspective view of the cargo storage assembly of FIG. 8 with a second portion of a cover assembly in an open position.

The first portion 26 may be divided into a first side section 110 and a second side section 112, and the second portion 28 may be defined into a third side section 114 and a fourth side section 116. The first and second portions 26, 28 are hingedly coupled by a first plurality of hinges 120 and are rotatable about the first axis X' as shown by arrows C of FIGS. 9 and 10. When the first portion 26 is rotated about the first axis X', as shown in FIG. 9, the first and second side sections 110, 112 are moved simultaneously as a single unit. When the second portion 28 is rotated about the first axis X' as shown in FIG. 10, the third and fourth side sections 114, 116 are moved simultaneously as a single unit.

Figure 11:
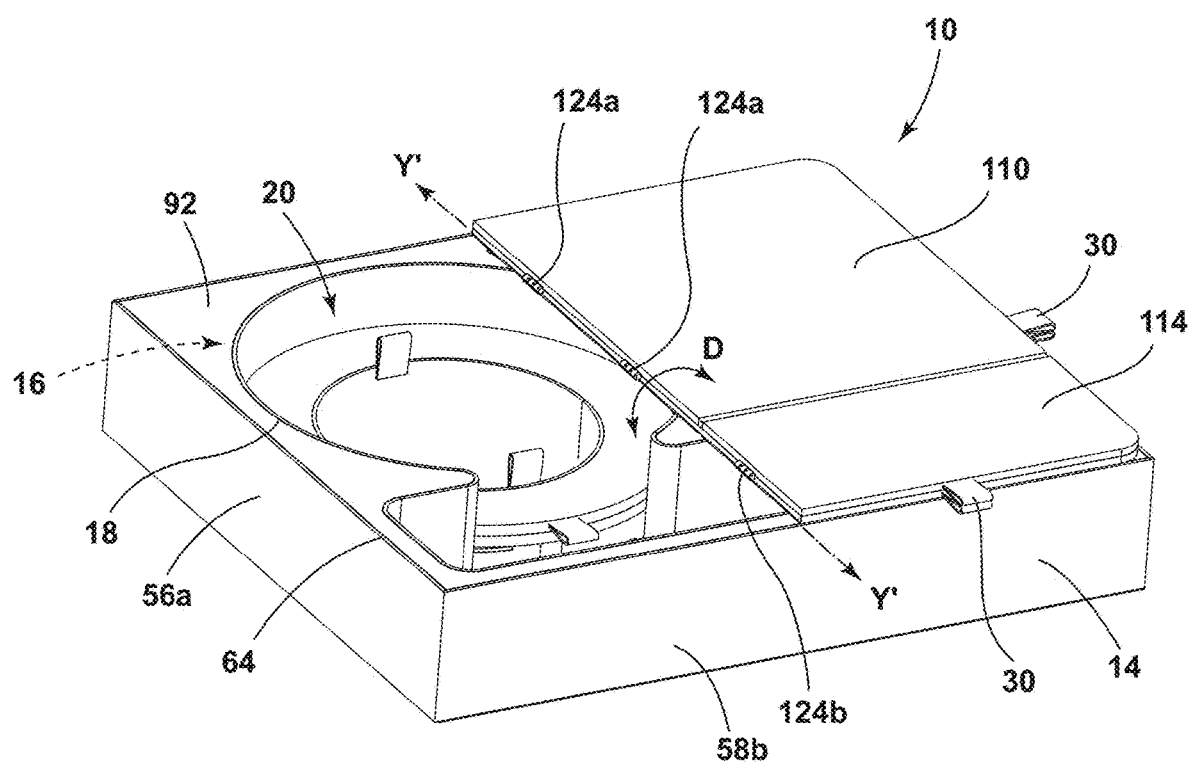
FIG. 11 is a side perspective view of the cargo storage assembly of FIG. 8 with a first side section of a cover assembly in an open position.
Figure 12:
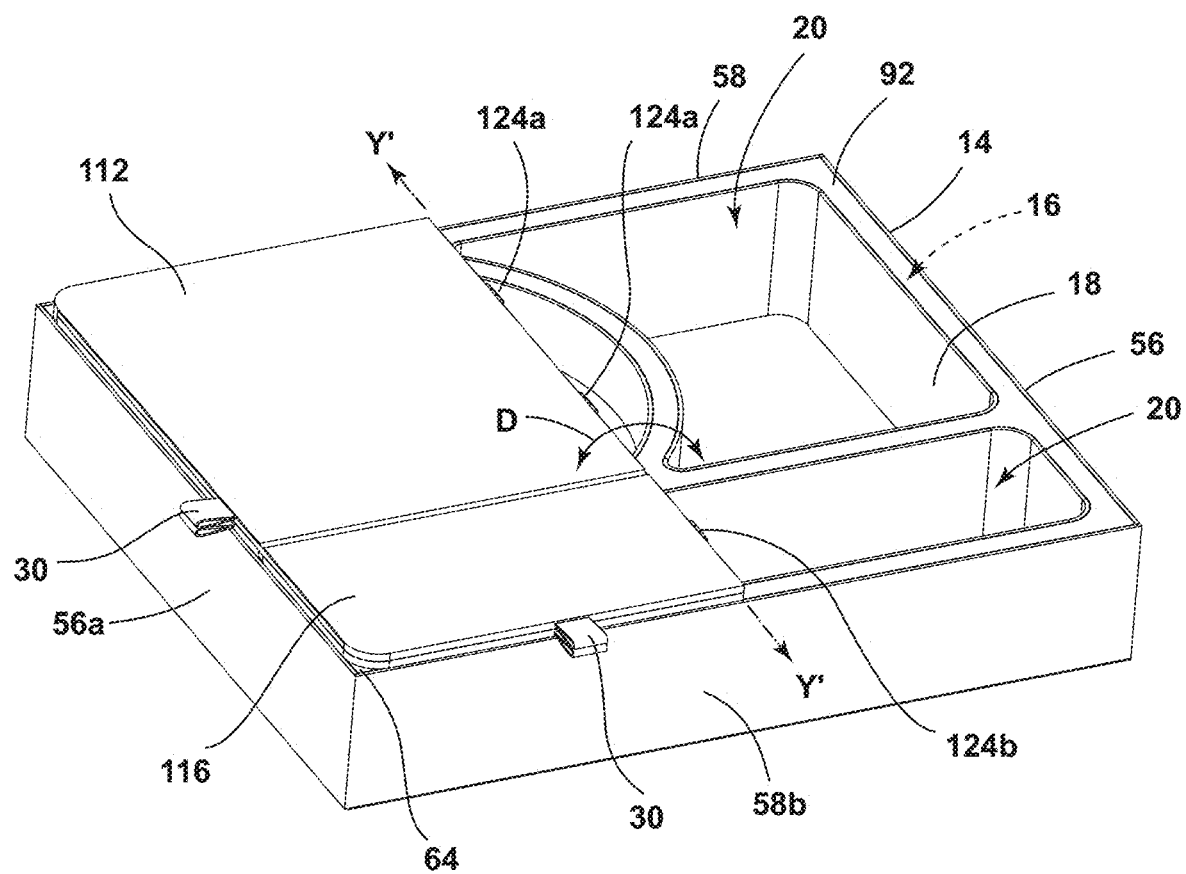
FIG. 12 is a side perspective view of the cargo storage assembly of FIG. 8 with a second side section of a cover assembly in an open position.

As best shown in FIGS. 11 and 12, the first portion 26 may further be hingedly coupled with the second side section 112 by a second plurality of hinges 124a, and the third side section 114 may be hingedly coupled with the fourth side section 116 by a third plurality of hinges 124b. The second and third plurality of hinges 124a, 124b are interspaced and aligned such that a second axis Y' extends through the second and third plurality of hinges 124a, 124b. The second and third plurality of hinges 124a, 124b are configured such that the first and third side sections 110, 114 may be rotated about the second axis Y' to an open position simultaneously (see arrow D of FIG. 11) and such that the second and fourth side sections 112, 116 may be rotated about the second axis Y' to an open position simultaneously (see arrow D of FIG. 12). The second axis Y' is substantially perpendicular to the first axis X'.

The various configurations of the cover of the cargo storage assembly, as illustrated in FIGS. 1-12, allows a user to more readily access the secondary cavities 20 of the cargo storage assembly 10 and provides additional storage options for a user. Moreover, where a seatback and support configuration is used, the cargo storage assembly 10 provides storage and seating within the cargo space 44 which may be optimized during activities requiring additional seating at the rear of the vehicle 12 when the vehicle 12 is parked (e.g., camping, tailgating, etc.).

It will be understood by one having ordinary skill in the art that construction of the described invention and other components is not limited to any specific material. Other exemplary examples of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A cargo storage assembly for a vehicle, comprising:
   an outer shell defining a primary cavity;
   an inner shell positioned within the primary cavity;
   a plurality of reinforcement members positioned between the outer shell and the inner shell within the primary cavity; and
   a cover assembly coupled with the outer shell and including a first portion hingedly coupled with a second portion, wherein each of the first and second portions is configured to be rotatable about an axis from a closed position to an open position.

2. The cargo storage assembly of claim 1, wherein the reinforcement members are interspaced along a plurality of walls of the outer shell.

3. The cargo storage assembly of claim 1, wherein the inner shell defines one or more secondary cavities.

4. The cargo storage assembly of claim 1, wherein the first portion of the cover assembly includes first and second side sections, and the second portion of the cover assembly includes third and fourth side sections, wherein the first side section is hingedly coupled with the third side section and the second side section is hingedly coupled with the fourth side section.

5. The cargo storage assembly of claim 1, wherein the first and second portions are joined by a living hinge.

6. The cargo storage assembly of claim 1, wherein the first portion includes a support section hingedly coupled with a seatback section.

7. The cargo storage assembly of claim 6, wherein the seatback section is hingedly coupled with the second portion of the cover assembly.

8. The cargo storage assembly of claim 6, wherein the support section includes a first edge and the seatback portion includes a second edge, the first and second edges configured to be aligned when the cover assembly is in the closed position.

9. The cargo storage assembly of claim 6, wherein the cover assembly further includes at least one outwardly extending corner member.

10. A cargo storage assembly for a vehicle, comprising:
    an outer shell including at least one wall and defining a primary cavity;
    an inner shell positioned within the primary cavity;
    a support member coupled with the at least one wall, the support member defining a receiving slot;
    a cover assembly movable between a closed position and a seating position and including a first portion hingedly coupled with a second portion, wherein the first portion includes a support section hingedly coupled with a seatback section, the support section includes an outwardly extending tab, and the outwardly extending tab is configured to be received by the receiving slot when the cover assembly is in the seating position.

11. The cargo storage assembly of claim 10, further comprising:
    a plurality of reinforcement members positioned within the primary cavity between the outer shell and the inner shell.

12. The cargo storage assembly of claim 11, further comprising:
    a substrate at least partially supported by the plurality of reinforcement members and coupled with the outer shell.

13. The cargo storage assembly of claim 10, wherein the seatback section of the first portion is hingedly coupled with the second portion.

14. The cargo storage assembly of claim 10, wherein the support section includes a first edge and the seatback section includes a second edge, the first and second edges configured to be aligned when the cover assembly is in the closed position.

15. The cargo storage assembly of claim 14, wherein the cover assembly further includes a plurality of hinges interspaced along the first and second edges.

16. A cargo storage assembly for a vehicle, comprising:
- an outer shell defining a primary cavity;
- an inner shell positioned within the primary cavity and spaced apart from the outer shell;
- a plurality of reinforcement members positioned within the primary cavity between the outer shell and the inner shell; and
- a cover assembly including a first portion hingedly coupled with a second portion by a first plurality of hinges, wherein the first portion includes a first side section hingedly coupled with a second side section by a second plurality of hinges and the second portion includes a third side section hingedly coupled with a fourth side section by a third plurality of hinges.

17. The cargo storage assembly of claim 16, wherein the inner shell defines at least one secondary cavity.

18. The cargo storage assembly of claim 16, wherein the first portion is movable relative to the second portion about a first axis.

19. The cargo storage assembly of claim 16, wherein the first and third side sections are movable relative to the second and fourth side sections about a second axis.

20. The cargo storage assembly of claim 16, wherein at least one of the first plurality of hinges, the second plurality of hinges, and the third plurality of hinges is a living hinge.

* * * * *